United States Patent [19]

Gough et al.

[11] 3,842,882

[45] Oct. 22, 1974

[54] PNEUMATIC TIRE HAVING SIDEWALLS OF UNEQUAL LENGTH

[75] Inventors: Vernon E. Gough, Croyde; Roy E. S. Waller, Sutton Coldfield, both of England

[73] Assignee: The Dunlop Company Limited, London, England

[22] Filed: Sept. 13, 1971

[21] Appl. No.: 180,182

Related U.S. Application Data

[63] Continuation of Ser. No. 858,957, Sept. 18, 1969, abandoned.

[52] U.S. Cl............ 152/352, 152/DIG. 6, 152/354, 152/361 R
[51] Int. Cl. .............................................. B60c 5/00
[58] Field of Search........... 152/DIG. 6, 352, 352 R, 152/354, 361 R

[56] References Cited
UNITED STATES PATENTS
2,028,702   1/1936   Hale.............................. 152/DIG. 6
FOREIGN PATENTS OR APPLICATIONS
1,192,380   4/1959   France.............................. 152/352

Primary Examiner—M. Henson Wood, Jr.
Assistant Examiner—Richard A. Bertsch
Attorney, Agent, or Firm—Stevens, Davis, Miller & Mosher

[57] ABSTRACT

A pneumatic tire having sidewalls of unequal length and a carcass constructed to conform when uninflated to equilibrium cross-sectional shape, the shorter sidewall terminating radially inwardly by that point at which the equilibrium shape of the sidewall becomes perpendicular relative to the axis of rotation of the tire.

5 Claims, 2 Drawing Figures

PNEUMATIC TIRE HAVING SIDEWALLS OF UNEQUAL LENGTH

This is a continuation of application Ser. No. 858,957, filed Sept. 18, 1969, now abandoned.

This invention relates to tubeless or tubed pneumatic tires.

It is usual that one shoulder of a tire tread becomes more worn than the other. This unevenness of wear is caused by rolling of the vehicle during cornering, the axially outermost sidewall of the tire, located on the sidewall of the tire located on the side of a vehicle outermost of the curve, carrying a larger load than the other sidewall.

It is an object of the present invention to provide a tire in which the unequal loading is accounted for.

In the present specification the words "equilibrium cross-sectional shape", wherever referred to, mean that shape of a tire which is obtained when a thin-wall tire carcass is inflated under higher than normal inflation pressure, the cord path of the uninflated tire carcass conforming to this shape, the equilibrium shape being unchanged upon inflation.

According to the invention there is provided a pneumatic tire having sidewalls of unequal length and a carcass constructed to conform when uninflated to equilibrium cross-sectional shape as herein defined the shorter sidewall terminating radially inwardly of that point at which the equilibrium shape of the sidewall becomes perpendicular when viewed in cross-section to the axis of rotation of the tire.

The pneumatic tire may be tubed or tubeless.

The sidewalls may be constructed to be similar in all respects apart from their length or, alternatively, one sidewall, preferably the longer, may be reinforced additionally by ply extension or separate reinforcing layers compared with the other for its whole length, in some instances the reinforcement extending from a sidewall over the crown of the tire to form a breaker or additional breaker reinforcement. Alternatively, the reinforcement may be confined to that portion of the longer sidewall which extends radially inwardly beyond the shorter sidewall and, in some instances, the reinforcement may commence at a position when viewed in cross-section at a radial position radially outwardly e.g. 1 inch radially outwardly of the radial position of the bead base of the shorter sidewall. The reinforcement may be of cross-biased or radially extending cords disposed at the same angle or a different angle to that of the carcass cords in the reinforcement region.

Alternatively, one sidewall can be reinforced from one bead to the crown region with a carcass ply of radial cords and the other sidewall with a carcass ply or plies of bias cords extending from its bead to the crown region in which region the carcass plies may overlap. In this alternative, the sidewalls provided with a carcass ply of radial cords will have a shape corresponding to that of the sidewall of an equilibrium-shaped symmetrical section radial ply tire, and the sidewall provided with a carcass ply of cross-ply cords will have a shape corresponding to that particular equilibrium shape of the sidewall of a symmetrical section cross-ply tire different from the shape of the radial ply sidewall. Thus the equilibrium shape of each sidewall is appropriate to its cord-angle construction. The shorter or alternatively the longer sidewall may be the region of the tire having the radial cord ply.

The crown region of the tire may be reinforced with low angle breaker layers e.g. 10° to 25° to form a belted tire.

The difference in length between one sidewall and the other should not be less than one quarter of an inch but can be substantially more; it should not, however, terminate beyond (radially outwardly of) that point at which the equilibrium shape of the sidewall becomes perpendicular (when viewed in cross-section) with the axis of rotation of the tire. In the case of car tires the preferred difference in bead base diameter between the two sidewalls is one inch where the bases of the beads are at an identical taper angle (e.g. both at a conventional 5° to 15° taper), the preferred corresponding difference, where the taper angle is 5° in one bead and 15° on the other, being either one half an inch or 1½ inches. It can be said that the range of difference in bead-base diameter of the sidewalls normally lies between 5 and 12 per cent of the larger diameter bead-base.

The invention also includes within its scope a tire and wheel, the tire being inflated upon the wheel and, on account of its equilibrium cross-sectional shape, being substantially symmetrically deflected radially under vertical static load despite the unequal sidewall length and not subject to asymmetric sideways deflection or asymmetric tilting.

The invention further includes a vehicle having fitted thereto a wheel and tire in accordance with a previously defined aspect of the invention, the wheel and tire being fitted with the longer sidewall disposed axially outwardly with respect to the longitudinal vehicle axis. Advantages of this arrangement are that there is more room left, inboard of the wheel, for the accommodation of a brake and there is a greater rim flange clearance height from the road so that the loaded tire is less likely to be crushed against a roadside curb. Furthermore, the longer tire sidewall is less likely to be dislodged from its bead seat on cornering.

One embodiment of the invention will now be described by way of example with reference to the accompanying drawings wherein.

Figure 1:
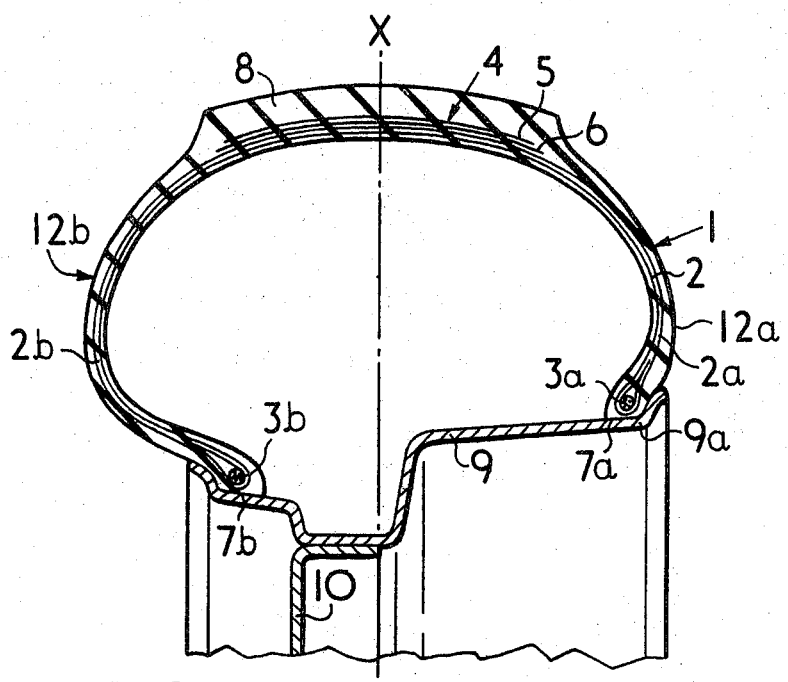
FIG. 1 illustrates a diagrammatic axial cross-sectional view of a pneumatic tire fitted to a rim.

A motor car tire 1 is constructed from a single textile ply of radial cords to form a carcass reinforcement 2, the ply being wrapped around annular bead wires 3a and 3b, in the usual manner, one bead wire 3a having a larger diameter than the other bead wire 3b, so that one sidewall 2a of the carcass will terminate short of the other 2b, i.e., it will have a larger diameter at the bead base. The profile of the carcass 2 is such that the shorter carcass sidewall 2a is a mirror image shape of the other sidewall 2b for that length of it which corresponds.

The carcass 2 is provided with a breaker assembly 4 formed of two layers 5 and 6 of steel cords disposed at about 20° to the mid-circumferential plane X—X of the tire tread, the assembly being moulded in a conventional manner, to the equilibrium cross-sectional shape as defined herein, the bead seats 7a and 7b being moulded to have a taper of 5° and 15° respectively. The difference in diameter of one bead seat 7a with respect to the other bead seat 7b is one inch the bead seat 7a being of largest diameter and a wheel 10 is provided having a rim 9 provided with appropriate bead seats and distances between flanges such that the tire mounted on the wheel, and inflated to normal pressure has no tendency for the cross-sectional shape of the tire to change when compared with its shape despite the unequal length, and when the tire is subjected to vertical static load, no asymmetric sideways deflection is set up or asymmetric tilting of the tread. The tire and wheel are fitted to a vehicle in a manner such that the longer sidewall 12b is disposed axially outwardly of the longitudinal axis of the vehicle.

Figure 2:
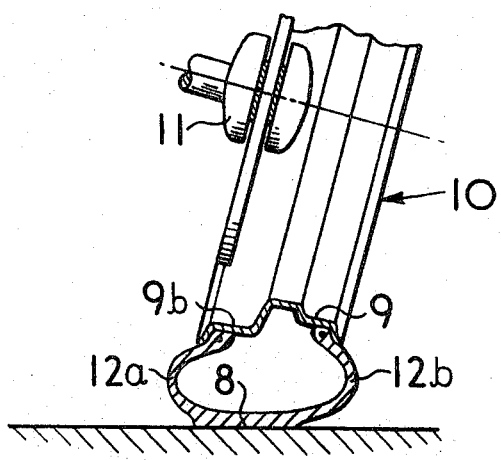
FIG. 2 illustrates a diagrammatic axial cross-sectional view of the tire illustrated in FIG. 1 during use thereof when travelling along the outside of a curved path.

During use of such a tire fitted to a wheel 10 when negotiating a bend or corner as illustrated in FIG. 2, it will be appreciated that by reason of the rolling of the vehicle (not shown) to which the wheel 10 is attached the axially outermost sidewall 12b of the tire located on the side of the vehicle outermost of the curve carries a larger load than the other sidewall 12a. The greater length of said axially outermost sidewall 12b allows the unequal loading to be accounted for.

In addition it will be seen from FIG. 2 that the provision of a rim 9 having a portion thereof 9a of relatively large diameter permits a brake device 11 to be accommodated in the wheel hub, without difficulty.

Having now described our invention, what we claim is:

1. A pneumatic tire having sidewalls of unequal length and a carcass having at least one ply of reinforcing cords, the cross-sectional shape of the carcass conforming, over the range of inflation pressure from uninflated to fully inflated, to the equilibrium cross-sectional shape for a carcass of corresponding width and cord angle, each sidewall terminating in a bead at a position radially inwardly of the point at which the equilibrium shape of the sidewall becomes perpendicular, when viewed in cross-section, to the axis of rotation of the tire.

2. A pneumatic tire according to claim 1 wherein the difference in bead base diameter of the sidewalls lies within the range 5 to 12% of the larger diameter bead base.

3. A pneumatic tire according to claim 1 wherein the bases of the bead are provided with different taper angles.

4. A pneumatic tire according to claim 1 and a wheel, the tire being inflated upon the wheel to conform to equilibrium cross-sectional shape.

5. A pneumatic tire having sidewalls of unequal length and a carcass having at least one ply of reinforcing cords, the cross-sectional shape of the carcass conforming, over the range of inflation pressure from uninflated to fully inflated, to the equilibrium cross-sectional shape for a carcass of corresponding width and cord angle, each sidewall containing cords of the same angle and terminating in a bead at a position radially inwardly of the point at which the equilibrium shape of the sidewall becomes perpendicular, when viewed in cross-section, to the axis of rotation of the tire, the shorter sidewall being a mirror image of the corresponding length of the longer sidewall in cross-sectional shape.

* * * * *